United States Patent [19]

Nahas et al.

[11] 4,077,778

[45] Mar. 7, 1978

[54] PROCESS FOR THE CATALYTIC GASIFICATION OF COAL

[75] Inventors: Nicholas C. Nahas, Morris Plains, N.J.; Charles J. Vadovic, Houston, Tex.

[73] Assignee: Exxon Research & Engineering Co., Linden, N.J.

[21] Appl. No.: 796,781

[22] Filed: May 13, 1977

Related U.S. Application Data

[63] Continuation-in-part of Ser. No. 617,698, Sep. 29, 1975, abandoned.

[51] Int. Cl.$^2$ ............................................. C10J 3/54
[52] U.S. Cl. ..................................................... 48/202
[58] Field of Search .................. 48/197 R, 202, 206, 48/210

[56] References Cited

U.S. PATENT DOCUMENTS

| | | | |
|---|---|---|---|
| 2,543,795 | 3/1951 | Mayer et al. | 48/202 |
| 2,652,319 | 9/1953 | Sweetser et al. | 48/206 |
| 2,654,665 | 10/1953 | Phinney | 48/206 |
| 2,682,455 | 6/1954 | Gorin | 48/206 |
| 3,004,839 | 10/1961 | Tornquist | 48/197 R |
| 3,779,725 | 12/1973 | Hegarty et al. | 48/202 |

Primary Examiner—Robert L. Lindsay, Jr.
Assistant Examiner—Peter F. Kratz
Attorney, Agent, or Firm—L. A. Proctor

[57] ABSTRACT

A process for the production of synthetic natural gas from a carbon-alkali metal catalyst or alkali-metal impregnated carbonaceous feed, particularly coal, by reaction of said feed with water (steam) in the presence of a mixture of hydrogen and carbon monoxide, in a series of staged fluidized bed gasification reactors (or gasification zones). The first reactor, or main reactor, of the series is operated as an entrainment reactor and entrained solids are carried over to the second reactor, or reactors, of the series. A carbonaceous feed, or coal, is thus partially gasified in a fluidized bed in the main reactor to form a product gas and a char, and char is entrained within the effluent gases, separated therefrom and then fed into the secondary gasification reactor, or reactors, of the series, the entrained char constituting feed to a secondary reactor, or reactors. Some char is also passed via dense phase transfer from the main reactor to the secondary reactor to maintain catalyst balance. More effective ultilization of the feed carbon is possible by use of the reactor system operated in such a manner than is possible by the sole use of the main reactor, even when the latter is operated at the same or at more optimum conversion conditions.

11 Claims, 1 Drawing Figure

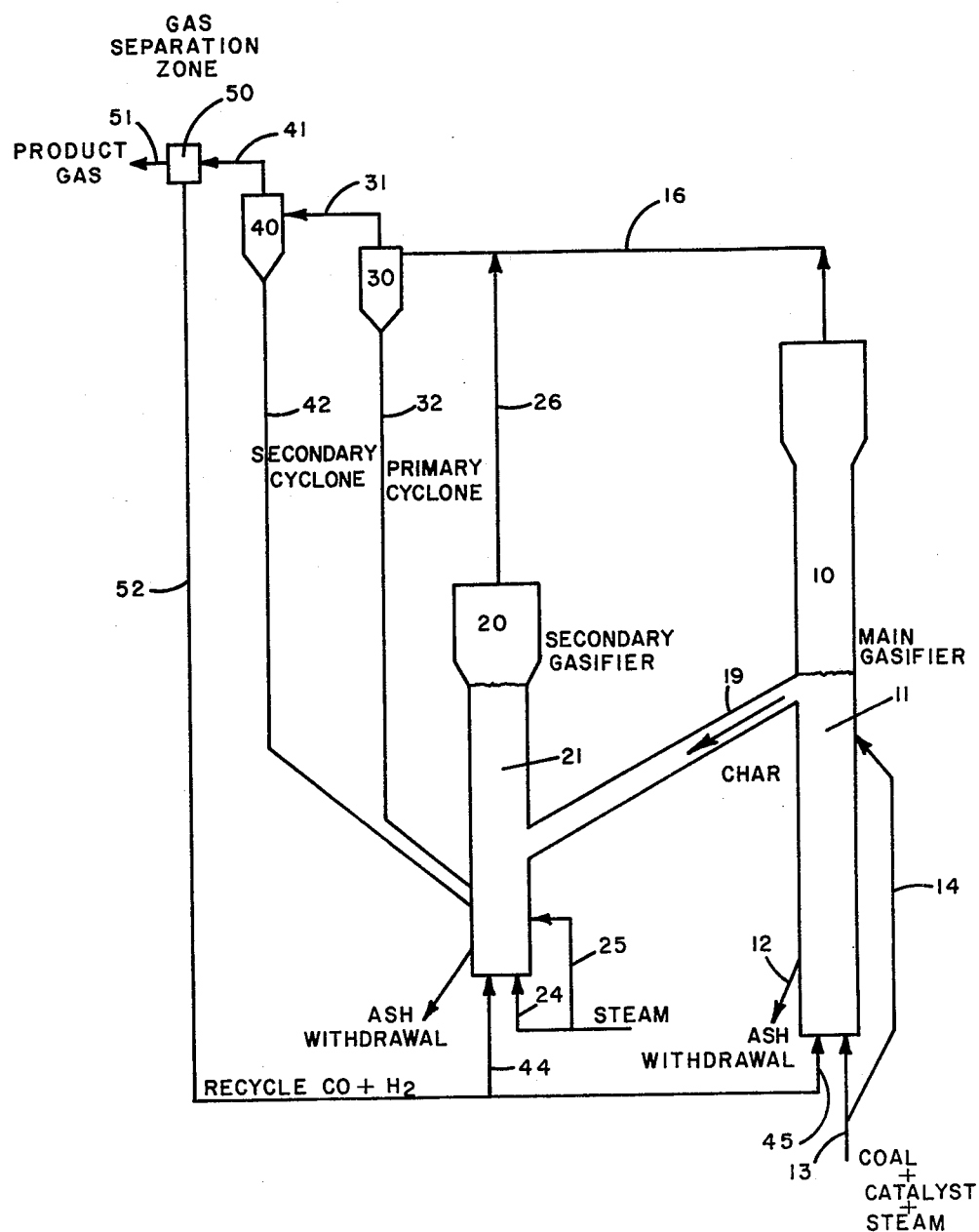
FIGURE

PROCESS FOR THE CATALYTIC GASIFICATION OF COAL

CROSS REFERENCE TO RELATED APPLICATIONS

This application is a Continuation-In-Part of copending application Ser. No. 617,698 which was filed Sept. 29, 1975 in the name of the same inventors as are named herein and now abandoned.

BACKGROUND OF THE INVENTION

Fuel oil and natural gas shortages have sparked renewed world-wide interest in the development of processes that can produce clean synthetic natural gas, or gas or pipeline quality, from carbonaceous solids, particularly coal. Various processes, both thermal and catalytic, are known for the gasification of coal to produce pipeline quality gas. In gasification processes of these types, raw gas mixtures are produced which include hydrogen, carbon monoxide and methane. Since methane, the desired high BTU component, cannot normally be directly produced within the gaseous product in adequate concentrations to provide a pipeline quality gas, the raw gases are upgraded in separate downstream reactors, and processing units to produce additional methane.

A raw gas, after separation of the methane component, is conventionally upgraded downstream of the main reactor in a series of shift-methanation reactions which increases the methane content of the gas. In a shift reaction, additional hydrogen is first generated by reacting carbon monoxide and steam to produce carbon dioxide and hydrogen, as characterized by the equation: $CO + H_2O \rightarrow CO_2 + H_2$. After removal of acid components (e.g., $CO_2$), the hydrogen is then reacted with carbon monoxide in a methanation reaction to produce methane, as characterized by the equation: $CO + 3H_2 \rightarrow CH_4 + H_2O$. There are, of course, many variables which determine the efficiency of any given gasification process. The amount of methane which can be directly produced in any given gasification process vis-a-vis that which can be indirectly produced, however, is an important variable in determining the efficiency of a coal gasification process.

Although both thermal and catalytic coal gasification processes have been generally known for many years, at least until recently, neither type of process had proven of outstanding efficiency, one type relative to the other. Each had its advantages and its disadvantages. Various designs of each process type are thus being widely investigated, and developed for possible commercial use. A catalytic process of admirable merit is described in Application Ser. No. 514,852, filed Oct. 15, 1974, by K. K. Koh et al. and not abandoned. In this process, herewith incorporated by reference, methane is produced in a catalytic gasification zone, suitably one containing a fluidized bed, by reacting steam with carbonaceous solids, particularly coal, in the presence of a carbon-alkali metal catalyst, or an alkali-metal impregnated carbonaceous feed, and a recycle stream of synthesis gas ($H_2 + CO$). The catalytic gasification reaction is conducted at temperatures ranging about 1000° to 1600° F, and at pressures ranging about 100 to 1500 pounds per square inch absolute (psia). A feature of this process is that completing reactions are suppressed by the recycle or synthesis gas, such that the net reaction products are essentially methane and carbon dioxide, in accordance with the equation: $2C + 2H_2O \rightarrow CH_4 + CO_2$. Product methane, carbon dioxide, and the synthesis gas used as recycle to suppress competing reactions are withdrawn from the gasifier, passed through a heat recovery system, and then sent to a cryogenic separation unit from which the methane and carbon dioxide are separately recovered. In a typical coal, 1 mole of methane that is recovered contains 98.7% of the energy of the 2 moles of carbon gasified.

The Koh et al. catalytic process offers profound advantages over prior art processes, both thermal and catalytic. Whereas the thermal efficiency of thermal gasification processes, in particular, is severely limited by the sequence of reactions, such limitations can be avoided by the Koh et al. catalytic process. A gas of high methane content can be directly produced. The gasification can be conducted at high rate, even at relatively low temperature. The reaction is substantial thermoneutral and, although it is necessary to heat the reactants to reaction temperature to initiate the reaction, essentially all of the heat supplied to the reactor is recovered. Hence, there is very little waste heat. The discovery that methane and synthesis gas can be equilibrated in the reaction, i.e., maintained in equilibrium by separation and recycle of synthesis gas to the reactor to produce methane directly, has eliminated all need for downstream shift-methanation reactions, and the thermal efficiency of this process is significantly higher than that of prior art processes.

Despite the relatively high efficiency, and other advantages offered by this process, a further deficiency resides in the less than total gasification of the feed carbon. A major source of carbon loss is caused by backmixing of particles, and by the elutriation of fines present in the feed coal, inclusive of the elutriation of fines created by attrition within the gasifier. Not only does the loss of the elutriated fines lower the amount of carbon conversion that is possible, but this also results in high catalyst losses, which effect is particularly manifest because a considerably greater weight proportion of catalyst is contained in the entrained fines than in the initial feed.

SUMMARY OF THE INVENTION

It is accordingly the primary objective of this invention to obviate these and other deficiencies, particularly those associated with catalytic coal gasification processes.

It is a specific object of this invention to provide a staged catalytic coal gasification process, particularly a two-stage gasification process, for the more effective gasification and utilization of the carbon content of a carbonaceous feed.

Another object is to provide a further improved coal gasification process of the type described in Application Ser. No. 514,852, supra.

These and other objects are achieved in accordance with the present invention, characterized as a process for the production of synthetic natural gas from a carbon-alkali metal catalyst or alkali-metal impregnated carbonaceous feed, particularly coal, by reaction of said feed with water (steam) in the presence of a mixture of hydrogen and carbon monoxide, in a series of staged fluidized bed gasification zones, inclusive of a main gasification zone, or zones, wherein the carbonaceous feed, or coal, is partially gasified in a fluidized bed to form a product gas and a char, and char is entrained within the effluent gases, separated therefrom and then fed into a subsequent or secondary gasification zone, or zones, as a major source of carbon feed to said secondary gasification zone, or zones. Within the process more effective utilization of the feed carbon, based on total weight of feed carbon to the main gasification zone, or zones, is possible than by the sole use of the main reaction zone, or zones, even when the latter is operated at the same or at conditions more favorable for gasification of the feed carbon.

BRIEF DESCRIPTION OF THE DRAWING

The FIGURE is a schematic flow diagram of a two stage gasification process within the scope of this invention.

DESCRIPTION OF THE PREFERRED EMBODIMENT

In a preferred embodiment, crushed or particulate coal impregnated with an alkali-metal is fed into the fluidized bed gasification zone of a main reactor of a series. Suitably, raw coal is crushed to average particle sizes ranging from about 4 to about 325 mesh (Tyler), preferably from about 8 to about 200 mesh, and then impregnated as by spraying or otherwise admixing same with a solution of an alkali-metal salt, or mixture of alkali-metal salts, inclusive particularly of potassium salts, notably potassium carbonate, and the coal then dried to form a suitable carbonaceous feed.

The impregnated coal is fed into the fluidized bed gasification zone of the main reactor, contacted, devolatilized and reacted therein with water (steam) and a fresh or recycle mixture of hydrogen and carbon monoxide, typically at a temperature providing a $H_2$:CO molar ratio of about 3:1, at superficial linear velocities ranging from about 0.5 to about 3 feet/second, preferably from about 1 to 2 feet/second, sufficient to provide from about 5 to about 30 percent, preferably from about 10 to about 20 percent, entrainment of the solid fines char, based on the weight of total carbon feed to the fluid bed gasification zone of the main reactor. In addition to the fine solids char which is transferred by entrainment in the effluent gases from the fluidized bed of the main gasification zone to the secondary gasification zone, or zones, from about 5 to about 30 percent, and preferably from about 5 to about 15 percent, based on the total weight of carbon feed to the main gasification zone, is fed into the secondary gasification zone, or zones, by direct dense phase flow. Suitably, the depth of the fluidized bed of the main reactor ranges from about 20 to about 140 feet, preferably from about 50 to about 120 feet, and the average particle size of the solid fines char entrained in the effluent gases ranges below about 200 mesh, preferably about 325 mesh.

The residence time of the unreacted solids within the main reactor ranges generally from about 3 to about 15 hours, and preferably from about 4 to about 10 hours. The temperature of the fluidized bed reaction zone of the main reactor, or high entrainment reactor, is maintained from about 1000° to about 1600° F, preferably from about 1200° to about 1400° F, essentially any pressure could be used but pressures ranging from about 100 to about 1500 psia are most effective and pressures from about 500 to 1000 psia are preferred. The fine solids char entrained in the product gas stream from the gasification zone of the main reactor is separated, preferably by one or a series of cyclone separators, and fed into the fluidized bed of the secondary gasification zone, or zones.

The gases entering the fluidizied bed of the secondary gasification zone, or zones, is maintained at a velocity below that used in the main gasification zone, or zones, and sufficiently low to avoid significant entrainment of the fine solids char. Sufficiently long residence time is required to permit substantially complete conversion of the carbonaceous matter of the char to gases. Suitably, the superficial linear gas velocities within the secondary gasification zone, or zones, ranges from about 0.05 to about 1.0 feet per second, preferably from about 0.1 to about 0.5 feet per second, this avoiding significant entrainment of the fine solids char within the effluent gases. Generally, essentially complete gasification of the fine solids char is obtained at residence times ranging from about 3 hours to about 15 hours, preferably from about 4 to about 10 hours.

The secondary gasification zone, or zones, can be operated at the same or at different temperatures and pressures, either greater than or less than those employed in the main gasification zone, the temperature generally being selected to achieve an optimum balance between the desired product gas composition and carbon gasification rate. Suitably, the secondary gasificaton zone, or zones, is operated at temperatures ranging from about 1000° to about 1600° F, and preferably at temperatures ranging from about 1200° to about 1400° F. Again, essentially any pressure could be used but pressures ranging from about 100 psia to about 1500 psia are most effective and pressures from about 500 psia to about 1000 psia are preferred, and during any given period of operation generally approximates that employed in the main gasification zone, or zones. In general, the depth of the fluidized bed of the secondary gasification zone, or zones, approximates that of the main gasification zone differing, in any given operation, only by a small amount wherein a differential head is maintained to transfer fine char solids from the main gasification zone. The product gas can then be passed through a heat recovery system for recovery of heat values. Product methane and carbon dioxide from the gasification zones, after removal of the fine solids char, is separated from the synthesis gas, or mixture of hydrogen and carbon monoxide, as in a cryogenic separation, and the latter is recycled to the main and secondary gasification zones to suppress reactions which compete with the formation of methane and carbon dioxide.

These and other features of the present process will be better understood by reference to the attached FIGURE, and to the following description and examples which make reference to a specific two-stage gasification process depicted in the FIGURE. The FIGURE depicts, in schematic fashion, a preferred embodiment of this invention.

Referring generally to the FIGURE, there is shown a pair of gasifiers, a main gasifier 10 and a secondary gasifier 20, each of which contains a fluidized bed 11, 21 of particulate coal solids. Raw particulate coal, impregnated, e.g., with 10–30 percent potassium carbonate, based on the total weight of the coal, or a potassium-coal catalyst, is added with water (steam) into the fluidized bed 11 of the main gasifier 10. The feed coal and alkali-metal salt is fed pneumatically either to the bottom or side of the main gasifier 10, with steam as the transfer medium as via lines 13, 14. Fresh or recycled synthesis gas, approximating $3H_2$:1 CO in molar composition, is added with the steam, the velocity of the gases being adequate not only to fluidize the bed 11 but also to entrain from about 5 to 30 percent, preferably from about 10 to 20 percent of the fine solid coal particles, based on the weight of coal feed to the main gasifier 10, and sweep these from the main gasification zone. Ash is optionally withdrawn from the bottom of the main gasifier 10 as via line 12, and the level of the fluidized beds 11, 21 within the gasifiers 10, 20 are maintained by a direct dense phase flow line 19 which interconnects the two gasifiers 10, 20. Some flow of solids from the main gasifier 10 to the secondary gasifier 20 is necessary, but essentially limited to that necessitated for the purge of ash from the main gasifier 10 and that necessary to maintain gasifier 10 in catalytic balance. The driving force for this flow is regulated by the difference provided between the solids levels of beds 11, 21 within the two gasifiers 10, 20. Effluent gas from the main gasifier 10 is removed from the overhead portion of the gasifier and conveyed by an appropriate line 16, with effluent gas conveyed via an appropriate line 26 from the secondary gasifier 20, to one or a series of cyclone separators, e.g., a primary cyclone 30 and a secondary cyclone 40. Gas from primary cyclone separator 30 is removed via line 31 and passed to the secondary cyclone 40, which gas exits therefrom and is fed via line 41 into a product gas separation zone 50. A product gas consisting essentially of methane is removed via line 51 and synthesis gas is removed via line 52. Fine solids are returned to the secondary gasifier 20 from the primary and secondary cyclone separators 30, 40 via lines 32, 42, respectively. Synthesis gas is recycled via lines 52, 44 and 52, 45 to gasifiers 20, 10, repsectively, to suppress reactions which compete with that favoring the formation of equimolar quantities of methane and carbon dioxide from a stoichiometric amount of carbon and water in accordance with the equation: $2C + 2H_2O \rightarrow CH_4 + CO_2$. Steam is fed via lines 24, 25, with recycle synthesis gas, into the bottom of gasifier 20 as a reactant to fluidize bed 21.

In accordance with this invention, it has been found feasible to effectively utilize as high as about 95 to 99%, and higher, of the feed carbon fed to the main gasification zone, or gasifier. This is sharply contrasted with the operation of a single gasifier which, at optimum conditions, provides only from about 70 to about 85 percent utilization of the feed carbon which can be gasified to provide useful end products. The following comparative data are illustrative of the advantages resultant from the practice of this invention.

The data given in Table I below are illustrative of typical catalyst levels and the carbon conversion levels obtained, for two different cases, in the operation of the preferred two-stage catalytic gasification process, employing 10 weight percent potassium carbonate on Illinois #6 type coal, at the conditions described.

TABLE I

| Unit: | Main Gasifier | Secondary Gasifier |
|---|---|---|
| Process Conditions: | | |
| Temperature, °F | 1400 | 1400 |
| Pressure, psia | 50 | 50 |
| Gas Velocity, Ft. per second | 2 | 0.5 |
| Residence Time of Solids, Hrs. | 5 | 7 |

ESTIMATED CARBON & CATALYST FLOWS TO GASIFIERS

| Case 1 | Total | Carbon | Ash | Potassium |
|---|---|---|---|---|
| | | #/Hr. | | |
| (Carryover = 10% Entrainment of Feed) | | | | |
| Feed Coal to Main Gasifier | 100 | 66.5 | 17 | 5 |
| Carryover by Entrainment to Secondary Gasifier | 10 | 6.0 | 4.0 | 1.4 |
| Withdrawal by Dense Phase Transfer from Main Gasifier | 14.7 | 4.4 | 10.3 | 3.6 |
| Total Feed to Secondary Gasifier | 24.7 | 10.4 | 14.3 | 5 |
| Ash Withdrawal from Secondary Gasifier | 15.0 | 0.7 | 14.3 | 5 |
| Carbon Gasification Percentage | | | | |
| Main | | | | 84.4 |
| Secondary | | | | 14.6 |
| TOTAL | | | | 99.0 |

| Case 2 | Total | Carbon | Ash | Potassium |
|---|---|---|---|---|
| | | #/Hr. | | |
| (Carryover = 20% Entrainment of Feed) | | | | |
| Feed Coal to Main Gasifier | 100 | 66.5 | 17 | 5 |
| Carryover by Entrainment to Secondary Gasifier | 20 | 12.0 | 8 | 2.8 |
| Withdrawal by Dense Phase Transfer from Main Gasifier | 9.0 | 2.7 | 6.3 | 2.2 |
| Total Feed to Secondary Gasifier | 29.0 | 14.7 | 14.3 | 5.0 |
| Ash Withdrawal from Secondary Gasifier | 15.0 | 0.7 | 14.3 | 5.0 |
| Carbon Gasification Percentage | | | | |
| Main | | | | 77.9 |
| Secondary | | | | 21.1 |
| TOTAL | | | | 99.0 |

From these data it will be observed that 99 percent of the feed carbon, based on the weight of coal feed to the main gasifier, can be gasified to useful end products. The secondary gasifier, which is fed by fines carryover and some direct feed dense phase transfer of char from the main gasifier, accounts for about 14 to 21 percent of the total conversion of the carbon to useful end products whereas from about 78 to 84 percent of the conversion occurs in the main gasifier.

It is apparent that various modifications can be made in the process without departing the spirit and scope of the present invention. The present process provides generally, a high entrainment main gasifier, or group of gasifiers, wherein after separation of the fine solids char from the product gas, the char is fed into a secondary gasifier, or group of gasifiers, as a principle source of carbon feed. In contrast to the main gasifier, or group of gasifiers, the entrained solids from the main gasifier, or group of gasifiers, constitutes a major source of carbon feed to the secondary gasifier, or group of gasifiers, although some carbon feed is also transferred from the main gasifier, or gasifiers, by dense phase transfer. The secondary gasifier, or gasifiers, are necessarily operated at low gas velocities to avoid significant fines entrainment, and long residence times are provided to effect essentially complete conversion of the carbon-feed to useful gaseous products. In a preferred mode of operation a plurality of main gasifiers are employed to feed char to a single secondary gasifier.

What is claimed is:

1. In a process for the production of synthetic natural gas by the conversion of a solid carbonaceous feed, in the presence of a carbon-alkali catalyst, by contact of said feed in a gasification zone containing a fluidized bed of char, with steam and a mixture of hydrogen and carbon monoxide gases added to said zone to suppress reactions which compete with the formation of equimolar concentrations of methane and carbon dioxide from a stoichiometric equivalent of carbon and water, the improvement comprising continuously supplying to a main gasification zone a solid carbonaceous feed, a carbon-alkali catalyst, steam and a mixture of hydrogen and carbon monoxide gases, gasifying said solids carbonaceous feed at temperatures ranging from about 1000° to about 1600° F and pressures ranging from about 100 psia to about 1500 psia by injecting gases upwardly at superficial linear velocities ranging from about 0.5 to about 3 ft/sec. sufficient to devolatilize and react with the solid carbonaceous feed to form char and gaseous effluent, maintain the char in fluidized state and entrain within the gaseous effluent from about 5 to about 30 percent of the fine solid char, based on the weight of total feed to said main gasification zone, separating the entrained char from the gaseous effluent, and feeding said char into a secondary gasification zone, recovering from the gaseous effluent a synthetic natural gas consisting essentially of methane and a synthesis gas comprising hydrogen and carbon monoxide, removing from said fluidized bed of char of said main gasification zone from about 5 to about 30 percent additional char, based on the weight of total feed, feeding said char via dense phase transfer as an admixture of char and carbon-alkali catalyst into said secondary gasification zone, continuously supplying to said secondary gasification zone steam and a mixture of hydrogen and carbon monoxide gases, gasifying said char at temperatures ranging from about 1000° to about 1600° F and pressures ranging from about 100 psia to about 1500 psia by injecting gases upwardly at superficial linear velocities below those employed in said main gasification zone and ranging from about 0.05 to about 1 ft/sec. sufficient to maintain the char in fluidized state, but insufficient to entrain any significant amount of the char, withdrawing a gaseous effluent from said secondary gasification zone and recovering synthetic natural gas consisting essentially of methane and a synthesis gas comprising hydrogen and carbon monoxide, from said gaseous effluent, recycling the recovered synthesis gases as the hydrogen and carbon monoxide gases supplied to the main and secondary gasification zones, whereby more efficient utilization of the feed carbon is achieved than can be obtained by the sole use of the main reaction zone, even when said main reaction zone is operated at the same or conditions more favorable for gasification of the feed carbon.

2. The process of claim 1 wherein the solid carbonaceous feed fed into the main gasification zone is coal.

3. The process of claim 2 wherein the solid carbonaceous feed fed into the gasification zone is coal, and said coal is impregnated with potassium to produce said carbon-alkali catalyst.

4. The process of claim 1 wherein the mixture of hydrogen and carbon monoxide gases are recycled to the main and secondary gasification zones approximates a $3H_2:1CO$ molar composition.

5. The process of claim 1 wherein the temperature of the main gasification zone ranges from about 1200° to about 1400° F, and the pressure ranges from about 500 to about 1000 psia.

6. The process of claim 1 wherein the superficial linear velocities of the gases entering the main reaction zone ranges from about 1 to about 2 feet per second sufficient to entrain from about 10 percent to about 20 percent of the fine solids char, the entrained char being fed into the secondary gasification zone with from about 5 to about 15 percent additional char which is fed via dense phase transfer into the secondary gasification zone.

7. The process of claim 1 wherein the temperature of the secondary gasification zone ranges from about 1200° to about 1400° F and the pressure ranges from about 500 psia to about 1000 psia.

8. The process of claim 1 wherein the superficial linear velocities of the entering gases to the secondary gasification zone range from about 0.1 to about 0.5 feet per second.

9. The process of claim 1 wherein the residence time of the unreacted solids in both the main gasification zone and secondary gasification zone ranges from about 3 to about 15 hours.

10. The process of claim 1 wherein the average particle size of the char entrained within the gases fed into the secondary gasification zone ranges below about 200 mesh.

11. The process of claim 1 wherein the average particle size ranges below about 325 mesh.

* * * * *